United States Patent
Kilpinen et al.

(10) Patent No.: US 12,493,178 B2
(45) Date of Patent: Dec. 9, 2025

(54) SENSOR BASED CONTROL OF AN OPTICAL DEVICE WITH A VARIABLE OPTICAL POWER OR A VARIABLE BEAM DEFLECTION

(71) Applicant: poLight ASA, Tønsberg (NO)

(72) Inventors: Janne Tapani Kilpinen, Akaa (FI); Vladimir Kartashov, Horten (NO); Nicolas Tallaron, Neuville sur Saône (FR); Alain Gillet, Galan (FR); Pierre Craen, Embourg (BE)

(73) Assignee: poLight ASA, Tønsberg (NO)

( * ) Notice: Subject to any disclaimer, the term of this patent is extended or adjusted under 35 U.S.C. 154(b) by 267 days.

(21) Appl. No.: 18/550,097

(22) PCT Filed: Mar. 30, 2022

(86) PCT No.: PCT/EP2022/058413
§ 371 (c)(1),
(2) Date: Sep. 11, 2023

(87) PCT Pub. No.: WO2022/207706
PCT Pub. Date: Oct. 6, 2022

(65) Prior Publication Data
US 2024/0151960 A1  May 9, 2024

(30) Foreign Application Priority Data
Mar. 30, 2021  (EP) .................................. 21165787

(51) Int. Cl.
  *G02B 26/08*  (2006.01)
  *G01B 7/16*  (2006.01)
  *G01B 11/16*  (2006.01)

(52) U.S. Cl.
  CPC ............... *G02B 26/08* (2013.01); *G01B 7/16* (2013.01); *G01B 11/16* (2013.01)

(58) Field of Classification Search
  CPC ........... G02B 26/08; G01B 7/16; G01B 11/16
  (Continued)

(56) References Cited

U.S. PATENT DOCUMENTS

2011/0149409 A1  6/2011  Haugholt et al.
2017/0123113 A1*  5/2017  Moreau .............. G02B 26/0825

FOREIGN PATENT DOCUMENTS

EP  2187242 A1  5/2010
EP  2187242 B1  9/2011
(Continued)

OTHER PUBLICATIONS

International Search Report for PCT/EP2022/058413 dated Jul. 22, 2022.

*Primary Examiner* — Balram T Parbadia
*Assistant Examiner* — Mitchell T Oestreich
(74) *Attorney, Agent, or Firm* — Knobbe, Martens, Olson & Bear, LLP

(57) ABSTRACT

The invention relates to a controllable optical assembly such as a controllable lens or a controllable beam deflector. The optical assembly comprises first and second cover members, wherein one of them is transparent while the other is transparent or reflective. A transparent, deformable, non-fluid body is sandwiched between the first and second cover members so that the first and second cover members and non-fluid body constitute a lens or a light deflector. Actuators are arranged to generate a controllable bending and/or tilt of the first and/or the second cover member dependent on a control signal. One or more sensors are provided to generate a measurement signal indicative of the bending or tilt of the first and/or the second cover member. The control signal is determined based on the measurement signal.

19 Claims, 12 Drawing Sheets

(58) Field of Classification Search
USPC .......................................................... 359/362
See application file for complete search history.

(56) References Cited

FOREIGN PATENT DOCUMENTS

| | | | | |
|---|---|---|---|---|
| EP | 2869097 A1 | 5/2015 | | |
| EP | 2952850 A1 * | 12/2015 | ............. | G02C 7/081 |
| WO | WO 2020/074711 A1 | 4/2020 | | |

* cited by examiner

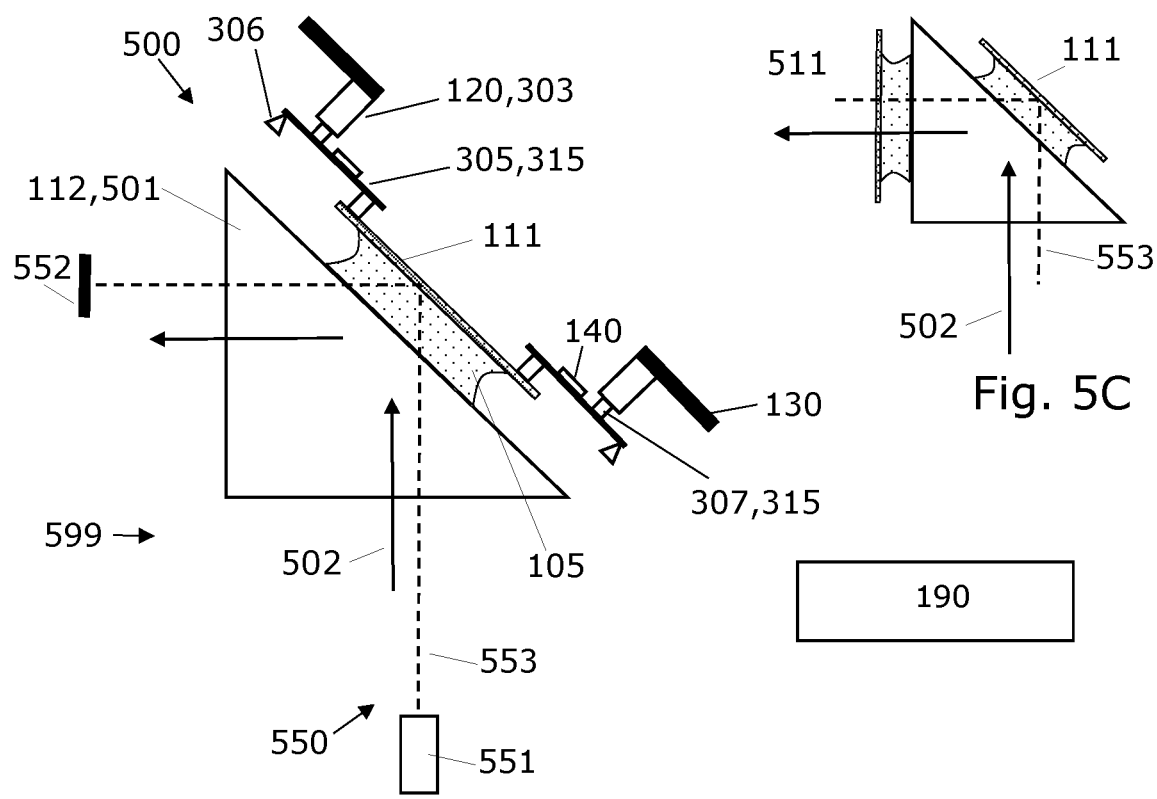
Fig. 5A
Fig. 5C
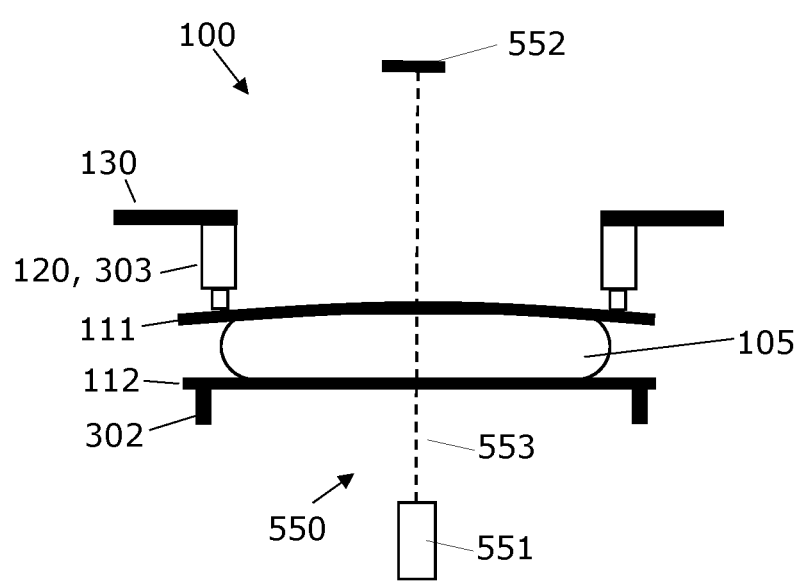
Fig. 5B

SENSOR BASED CONTROL OF AN OPTICAL DEVICE WITH A VARIABLE OPTICAL POWER OR A VARIABLE BEAM DEFLECTION

CROSS REFERENCE TO RELATED APPLICATIONS

This application is a U.S. National Phase Application of PCT International Application Number PCT/EP2022/058413, filed on Mar. 30, 2022, designating the United States of America and published in the English language, which is an International Application of and claims the benefit of priority to European Patent Application No. 21165787.9, filed on Mar. 30, 2021. The disclosures of the above-referenced applications are hereby expressly incorporated by reference in their entireties.

FIELD OF THE INVENTION

The invention relates to optical devices with variable optical power or variable beam deflection and to methods for controlling such devices.

BACKGROUND OF THE INVENTION

In order to enable successful use of devices with variable optical power or variable deflection, high accuracy of the variable parameter is required. This may be achieved by accurate calibration of the optical device. Accurate calibration is hard to achieve due to dependencies on temperature, hysteresis and long-term drift phenomena, i.e. creep. Another way to control the variable parameter is to develop a model of the optical device that could predict changes of the variable parameter caused by temperature, hysteresis and creep. However, still with this method, the model cannot predict exact values of the variable parameter for each optical device but only average values.

Accordingly, there is a need for improving control of such optical devices to achieve accurate control and to obtain technically feasible solutions.

SUMMARY

It is an object of the invention to improve improving control of variable lenses and adjustable light deflectors. Particularly, it is an object to improve measurement of variations in optical power and/or beam deflection of variable lenses and light deflectors.

In a first aspect of the invention there is provided a controllable optical assembly with a variable optical power and/or a variable beam deflection, the optical assembly comprises
- a first cover member and a second cover member, wherein one of the first and second cover members is a transparent cover member, and the other of the first and second cover members is a transparent or reflective cover member,
- a transparent, deformable, non-fluid body sandwiched between the first and second cover members, so that the first and second cover members and non-fluid body constitute a lens or a light deflector with an optical axis intersecting the non-fluid body and the first and/or the second transparent cover members,
- one or more actuators arranged to generate a controllable bending and/or tilt of at least the first cover member dependent on a control signal, where the control signal is obtainable from first and second measurement signals,
- first and second sensors arranged to provide the first and second measurement signals so that the measurement signals are indicative of the bending and/or tilt of at least the first cover member, and wherein the first sensor is an optical sensor and the second sensor is a deformation sensor.

With the actuators arranged to generate a controllable bending and/or tilt of at least the first cover member it is understood that the actuators may alternatively or additionally be arranged to generate a controllable bending and/or tilt of the first and/or the second cover member. One or more sensors may be arranged to provide the measurement signal so that the measurement signal is indicative of the bending or tilt of the first and/or the second cover member.

According to an alternative embodiment, the controllable optical assembly comprises either the first or the second sensor and would therefore be arranged to provide only one measurement signal from which the control signal is obtainable so that the measurement signal is indicative of the bending and/or tilt of at least the first cover member.

Advantageously, by measuring the bending of the cover member and thereby the change of optical power, or the tilt of the cover member and thereby the beam deflection, the measured change can be used in a feedback control system to accurately adjust the actuator to achieve a desired tilt or optical power.

Compared with other solutions using image sensor readings and processing to control the optical power, the direct measurement of e.g. lens bending, provides direct measurements of the optical power and thereby enables faster adjustments, e.g. in a feedback control loop. For example, it is known to use phase detectors in cameras for obtaining image sharpness measurements and using the measurements for adjusting image sharpness. However, phase detectors do not provide information about optical power.

The controllable optical assembly may further comprise a support structure arranged to support the first cover member and/or the second cover member.

The use of two different sensors wherein one of the sensors is an optical sensor and wherein another of the sensors is a deformation sensor combines the advantages of each of the sensors, e.g. so that the high accuracy of the optical sensor is combined with the direct stress sensing capabilities of the deformation sensors or other advantages such as low cost or simplified design of one of the sensors.

In an example, the deformation sensor, e.g. a piezo sensor, is used to control bending of the cover member based on sensor readings from the deformation sensor. For example, sensor readings from a piezo actuator which also serves as a piezo sensor may be used in an open loop algorithm which determines the voltage to be applied to the piezo actuator. An example of this open loop control is described in published PCT application WO2019/170793 which is hereby incorporated by reference. To increase accuracy the open loop control may be combined with a closed loop control where the sensor reading from the optical sensor is compared with a reference for the bending of the membrane.

The first and second sensors may be arranged to obtain measurement signals indicative of the bending and/or tilt of the first cover member, e.g. by connecting the deformation sensor with the first cover member to detect deformations of the first cover member and by arranging the optical sensor to optically detect changes in bending and/or tilt of the first cover member.

Examples of the deformation sensor includes the piezo electric sensor element such as the piezo electric element of one or more of the actuators. Other examples of the deformation sensor include strain gauge sensors in configurations as described herein. Examples of the optical sensor include any of the optical sensor configurations described herein where the light beam is reflected by at least the first cover member or transmitted through at least the first cover member.

The first and second sensor signals may each be indicative of bending or tilt. It is also possible that one of first and second sensors signals are indicative of bending while the other is indicative of tilt.

The control system can be configured to generate the control signal dependent on the first and second measurement signals to achieve a desired bending and/or tilt of the first and/or the second cover member. For example, the first and second measurement signals may be combined to improve measurement accuracy. In another example, the first measurement signal provides measurement of bending while the second measurement signal provides measurement of tilt. It is also possible that the first measurement signal may be used for initial adjustment of bending or tilt, while the second measurement signal may be used for continued adjustment of bending or tilt e.g. according to a set-point reference.

According to an embodiment, the second cover member is a prism and the first cover member is the reflective cover member arranged opposite to the hypotenuse of the prism to reflect at least a fraction the intensity of the incident light. Thus, the one or more actuators may be arranged to generate a controllable tilt of the reflective cover member.

According to an embodiment, the one or more actuators are displacement actuators capable of generating a linear or substantially linear displacement.

According to an embodiment, the controllable optical assembly comprises one or more elastic elements connecting the displacement actuators with the first cover member and/or the second cover member, wherein at least a portion of each of the one or more elastic elements is arranged to deform elastically in response to the actuator displacement.

Advantageously, the elastic elements may reduce undesired deformation in the cover member, which could be generated by stiff connections.

According to an embodiment, the one or more sensors are arranged to measure the deformation of a portion of the respective one or more elastic elements.

The measurement of the deformation generated in the elastic structure may advantageously be used for determining the tilt or bending of the cover member.

According to an embodiment, the support structure comprises a rigid frame.

The support structure, which alternatively could be less rigid, may be arranged to at least partially surround the non-fluid body and so that the support structure is separated from the non-fluid body to allow the non-fluid body to expand without contacting the support structure at least along a part of the support structure which surrounds or partially surrounds the non-fluid body.

The rigid support structure may be used for placement of a compensation sensor arranged so that it is not, or substantially not, exposed to deformation in response to bending of the first or the second cover member, wherein the at least one compensation sensor is of the same type as the one or more deformation sensors. The compensation sensor can be used for compensating temperature dependencies. Advantageously, when the support structure is separated from the non-fluid body, the support structure is not exposed to deformations in response to actuations and can therefore hold the compensation sensor.

According to an embodiment, the first cover member is fixed to the support structure and the one or more actuators are connected to a surface of the first cover member.

Such actuators may be surface mounted actuators arranged to generate surface strain on the cover member.

For example, the one or more actuators comprises one or more piezo electric elements connected to the surface of the first cover member.

The one or more piezo electric elements may comprise a ring shaped piezo electric element connected to the surface of the first cover member, wherein the ring shaped piezo electric element is configured with an aperture to enable transmission of the light.

According to an embodiment the one or more sensors comprise a piezo electric sensor element. Advantageously, piezo electric sensor elements may be used to achieve a high bandwidth of the measurement signal.

For example, the piezo electric sensor element may be one of the piezo electric elements used as an actuator. Accordingly, the piezo actuator may serve both as an actuator and as a sensor. PCT application WO2019/170793 which is hereby incorporated by reference describes how the piezo actuator can be used to determine a transfer function dc(V) for the piezo actuator based on measured transition times tt between two voltages applied to the piezo actuator. Thus, measures which depend on the piezo actuator, such as the capacitance of the piezo actuator, can be used to determine a transfer function of the piezo actuator so that it can be controlled e.g. in an open loop configuration.

According to an embodiment, the one or more sensors are deformation sensors connected to a surface of the one or more actuators. For example, the one or more actuators, such as linear displacement sensors, may be sandwiched between the one or more deformation sensors and the first or the second cover member. In this case the sensors may be arranged to measure the sensor deformation.

The optical assembly may comprises at least one compensation sensor arranged so that it is not, or substantially not, exposed to deformation in response to bending of the first or the second cover member, wherein the at least one compensation sensor is of the same type as the one or more deformation sensors. The at least one compensation sensor may be connected to the support structure.

The at least one compensation sensor and the one or more deformation sensors may be arranged so that a temperature dependency of the one or more deformation sensors is compensated by a corresponding temperature dependency of the at least one compensation sensor.

According to an embodiment, the deformation sensors are arranged symmetrically relative to an optical axis of the lens. For example, two or more deformation sensors may be arranged with the same radial distance to the optical axis and with the same circular arc-length between the sensors.

According to an embodiment, the control signal(s) is/are determined dependent on the measured deformations of the plurality of deformation sensors. For example, the control signals may be determined dependent on e.g. averages or differences from multiple sensors, or individual control signals may be determined for individually controllable actuators.

According to an embodiment, the sensor comprises a light source arranged to transmit a light beam so that the light beam is affected by the bending or tilt of the first and/or the second cover member, and where the sensor comprises a light detector (552) arranged to measure a change of the light beam relating to the bending and/or tilt.

According to an embodiment, the light source is arranged so that the light beam is reflected by the first or the second cover member arranged to be bent or tilted.

According to an embodiment, the light detector comprises at least two individual light detectors, each of the individual light detectors are capable of generating an output signal which is correlated with the power of the light impinging the individual light detector.

For example, two light individual light detectors may be used for sensing tilt in only one dimension. Three individual light detectors may be used for sensing tilt in two dimensions, although four individual light detectors may be preferred.

According to an embodiment, an output aperture of the light source and input apertures of the individual light detectors are arranged so that they face the first or the second cover member.

According to an embodiment, the light source is arranged at a center of a circle which circumscribes the individual light detectors.

According to an embodiment, the light source is arranged so that the light beam, such as the center of the intensity profile of the light beam, hits the first and/or the second cover member a distance away from the optical axis.

According to an embodiment, a plane of incidence spanned by the light beam and the surface normal at a location where the light beam hits the first and/or the second cover member does not comprise the optical axis.

According to an embodiment, the light source is arranged so that the light beam is transmitted through the first or the second cover members and wherein the light detector is arranged to measure the transmitted light beam. The light detector may be arranged so that its input aperture faces the optical axis.

A second aspect of the invention relates to an electronic device such as a camera module comprising the optical assembly according to the first aspect and a control system arranged to generate the control signal dependent on the first and second measurement signals to achieve a desired bending or tilt of the first and/or the second cover member. The electronic device may be a camera module, a light beam scanner, or other electronic device. For example, the light beam scanner may use the controllable beam deflection device, possibly the controllable lens, for various beam scanning purposes such as image projection, bar code scanning and 3D scanning.

A third aspect of the invention relates to method for controlling an optical assembly according to the first aspect, the method comprises obtaining first and second measurement signals from the one or more sensors so that the measurement signals are indicative of the bending and/or tilt of the first and/or the second cover member, determining a control signal based on the measurement signal, and controlling bending and/or tilt of the first and/or the second cover member dependent on the control signal.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 5A shows an optical assembly comprising a controllable beam deflection device, FIG. 5B shows an optical sensor used where the first cover member is arranged to be bent by displacement actuators.

DETAILED DESCRIPTION

Figure 1:
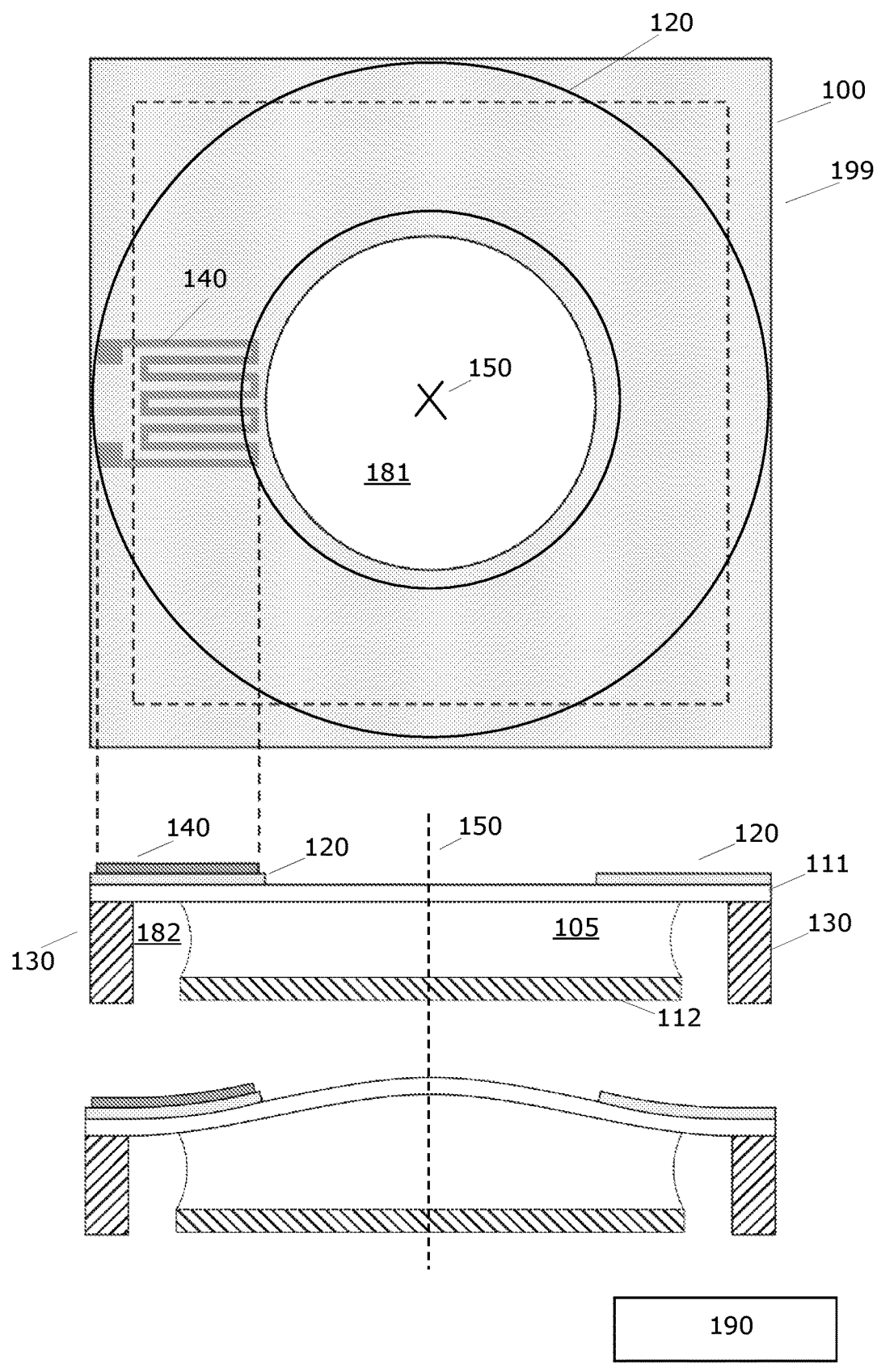
FIG. 1 shows an optical system comprising a controllable lens having a variable optical power.

FIG. 1 shows an optical assembly 199 comprising a controllable lens 100 having a variable optical power. The upper illustration is a top view, and the two lower illustrations are side views showing the lens in two different actuation states. The lens comprises a first cover member 111 and a second cover member 112. In an embodiment, the first and second cover members are a transparent. Alternatively, one of the first and second cover members is reflective, e.g. provided with a reflective metal layer to provide full or partial reflection so that the incident light beams are reflected back to the opposite transparent cover member.

For example, the second cover member may comprise a reflective surface arranged to reflect incident rays transmitted through the transparent first cover member back to the first cover member cover member. For convenience, examples and embodiments herein refer to transparent cover members 111, 112.

The lens 100 further comprises a transparent, deformable, non-fluid body 105 sandwiched between the first and second cover members, so that the first and second cover members and non-fluid body constitute the lens having an optical axis 150 intersecting the first and second cover members and the non-fluid body. The non-fluid body 105 abuts the inwardly facing surfaces of the first and second cover members 111, 112.

The optical axis 150 may be defined as the axis which passes through centers of the first and second cover members 111, 112 and the non-fluid body 105 and which is normal to a plane of one of the cover members. The optical axis is further defined according to conventional optical definitions.

One or more actuators 120 are arranged to generate a controllable bending, tilt or displacement or a combination thereof. The thereby controllable change of the overall outer shape of the lens is controlled dependent on an electrical or optical control signal, such as a control signal generated by a control system 190.

At least one of the first and second cover members 111, 112 are configured to be bent by forces or torques provided by the actuators 120. It is understood that the forces in general comprises forces distributed over an area, e.g. due to stresses generated by strains generated by surface mounted piezo elements. The lens comprises a support structure 130 arranged to support the first cover member and/or the second cover member 111,112. In this example, the first cover member 111 is supported by the support structure 130, e.g. fixed to the support structure, while the second support member 112 is not in contact with the support structure 130.

One or more sensors 140 are arranged to measure a deformation which correlates with the bending, tilt or displacement, or a combination of these. For example, in FIG. 1, if the right and left side actuators 120 are controlled differently, the bending of the first cover member 111 can be shaped asymmetrically to effectively cause a tilting effect. In the FIG. 1 example, the sensors 140 may be strain gauges or other sensor types capable for measuring deformation, i.e. strain. In this example, the sensor, a strain gauge, is mounted on top of the surface mounted piezo element so that it measures the deformation of the piezo element which is at least correlated with the bending of the first cover member 111.

A control system 190 is provided to generate the control signal dependent on the measured deformation—or dependent on measure tilt or a measured change of optical power, in general dependent on a measurement which is indicative of the bending or tilt—so as to achieve a desired bending and tilt, or a combination, of the first and/or the second cover member. For example, the control system 190 may comprise a feed-back control system arranged to minimize the difference between the measured tilt or bending and the desired tilt or bending. The control system 190 may be integrated with the lens, or the control system may be a separate control system arranged to receive the deformation signals from the deformation sensors and arranged to transmit the control signal to the actuators 120.

The transparent deformable, non-fluid lens body 105 is preferably made from an elastic material. Since the lens body is non-fluid, no fluid-tight enclosure is needed to encapsulate the lens body to prevent a leakage therefrom. As illustrated, the lens 100 comprises a gap 182 between the support structure 130 and the non-fluid body 105. The motion of the non-fluid body 105 is therefore unrestrained radially relative to the optical axis 150, i.e. along directions perpendicular to the optical axis. In a preferred embodiment, the lens body is made from a soft polymer, which may include a number of different materials, such as silicone, polymer gels, a polymer network of cross-linked or partly cross-linked polymers, and a miscible oil or combination of oils. The elastic modulus of the non-fluid lens body may be larger than 300 Pa, thereby avoiding deformation due to gravitational forces in normal operation. The refractive index of the non-fluid lens body may be larger than 1.3. The non-fluid body 105 may have a refractive index which is equal, substantially equal or close to the refractive index of the first and second cover members 111, 112 in order to reduce reflections at the boundaries of the non-fluid body 105.

The cover members 111, 112 are generally slab-shaped and may have curved such as a pre-shaped, e.g. spherical, shape or plane surfaces or a combination thereof. The cover members 111, 112 may be made from a large number of different materials, such as acrylics, polyolefins, polyesters, silicones, polyurethanes, glass and others. At least one of the first and second cover members 111, 112 which is arranged to be deformed by the actuators, has a stiffness which is suitable to enable bending by actuation of the actuators 121. In general, the material of the first and/or the second cover member 111, 112 may be formed in a material having a Young's modulus in the range between 5 MPa and 100 GPa to provide the necessary stiffness. For example, Young's modulus for borosilicate glass is 63 GPa, and 72 GPa for fused silica glass.

The bending of the first and/or second cover members 111, 112 is at least partly due to radially varying reaction forces from the lens body 105 which affects the Sag of the cover members 111, 112 and thus the optical power instead of just vertically compressing the lens body with no change in Sag. A full explanation of the effect of the lens body 105 on the curvature of the cover members is described in WO2019/002524A1 hereby incorporated by reference.

In the FIG. 1 example, the one or more actuators 120 comprise one or more piezoelectric elements mounted on the surface of the first cover member 111. For example, a single actuator 120 in the form of a sheet and annular ring shaped piezo element as shown is attached on a surface of the first cover member 111 in order to provide bending of the first cover member. One or more sensors 140 may be arranged on the ring shaped piezo element. Instead of a ring shaped element, a plurality of piezo elements may be distributed along a circle around the optical axis 150. One or more sensors may be arranged between the distributed piezo elements or between other actuators 120.

Accordingly, one or more deformation sensors may be connected to a surface of the one or more actuators, e.g. so that the one or more actuators are sandwiched between the one or more deformation sensors and the first cover member. Alternatively or additionally, one or more deformation sensors may be connected to a surface of the first or the second cover member 111, 112.

Actuators 120 configured in other ways are also feasible. For example, linear displacement actuators may be located between the first and second cover members 111, 112 and connected with the inwardly pointing surfaces of the cover members 111, 112, e.g. via elastic elements such as bendable elements arranged to accumulated e.g. radial relative displacements between the actuator 120 and the connection point on cover member 111, 112. In this case, the one or more sensors 120 may be mounted on one or more of the inwardly and outwardly pointing surfaces.

The one or more piezoelectric actuators 120 are arranged so that the lens 120 comprises an inner portion 181 which constitutes the lens area, surrounded by the one or more piezoelectric actuators 101, so that light can pass unobstructed through the lens area. The non-fluid body 105 is arranged so that it covers at least the lens area, but may also extend beyond the extension of the lens area towards the perimeter of the first or second cover member 111, 112.

The actuators 120 may be configured to solely generate a controllable bending of the first or the second cover member 111,112. Thus, by the actuation, the first and/or second cover member can be bend into a concave or convex shape and thereby provide an optical power to light transmitted through the lens.

Alternatively, the one or more actuators 120 may be arranged to displace and/or tilt one of cover members 111 relative to the other 112. For example, the actuators 120 may be arranged as explained above, between the cover members 111, 112, so that the relative angle between the two cover members can be changed, e.g. in order to change the direction of imaged light transmitted through the lens 100.

In another example, one of the cover members 111, 112 comprises a reflective surface to provide adjustable beam deflection of the reflected beam by controlling the tilt of the cover member.

The actuators may advantageously be arranged to provide bending of one of the cover members 111 in combination with tilt in order to generate optical power and beam deflection. The combined tilt and bending may be used with a transparent or reflective cover member. The beam deflection may be used to achieve optical image stabilization (OIS) in a camera such as a compact camera in a smart phone.

The support structure 130 may be configured as a rigid frame which is not deformed or substantially not deformed when the cover member 111, 112 connected to the support structure is deformed or exposed to stresses from the actuators. The support structure may be arranged so that it at least partially surrounds the non-fluid body and thereby provides a continuous support for the connected cover member 111, 112. Furthermore, the controllable lens 100 may be arranged with a gap 182 such as an air gap 182 between the perimeter of the non-fluid body 105 and the support structure, i.e. a gap extending radially relative to the optical axis 150 and separating the perimeter of non-fluid body 105 in a radial direction from the support structure 130. Due to the gap, the non-fluid body is able to expand unconstrained in the radial direction in response to actuator actions.

The output signal from the sensor 140 may depend on other physical effects than deformation. Such other effects comprises temperature, hysteresis and creep. At least temperature dependency of the sensor 140 may be compensated, or at least partially compensated, if two identical sensors are arranged close to each other.

Figure 2:
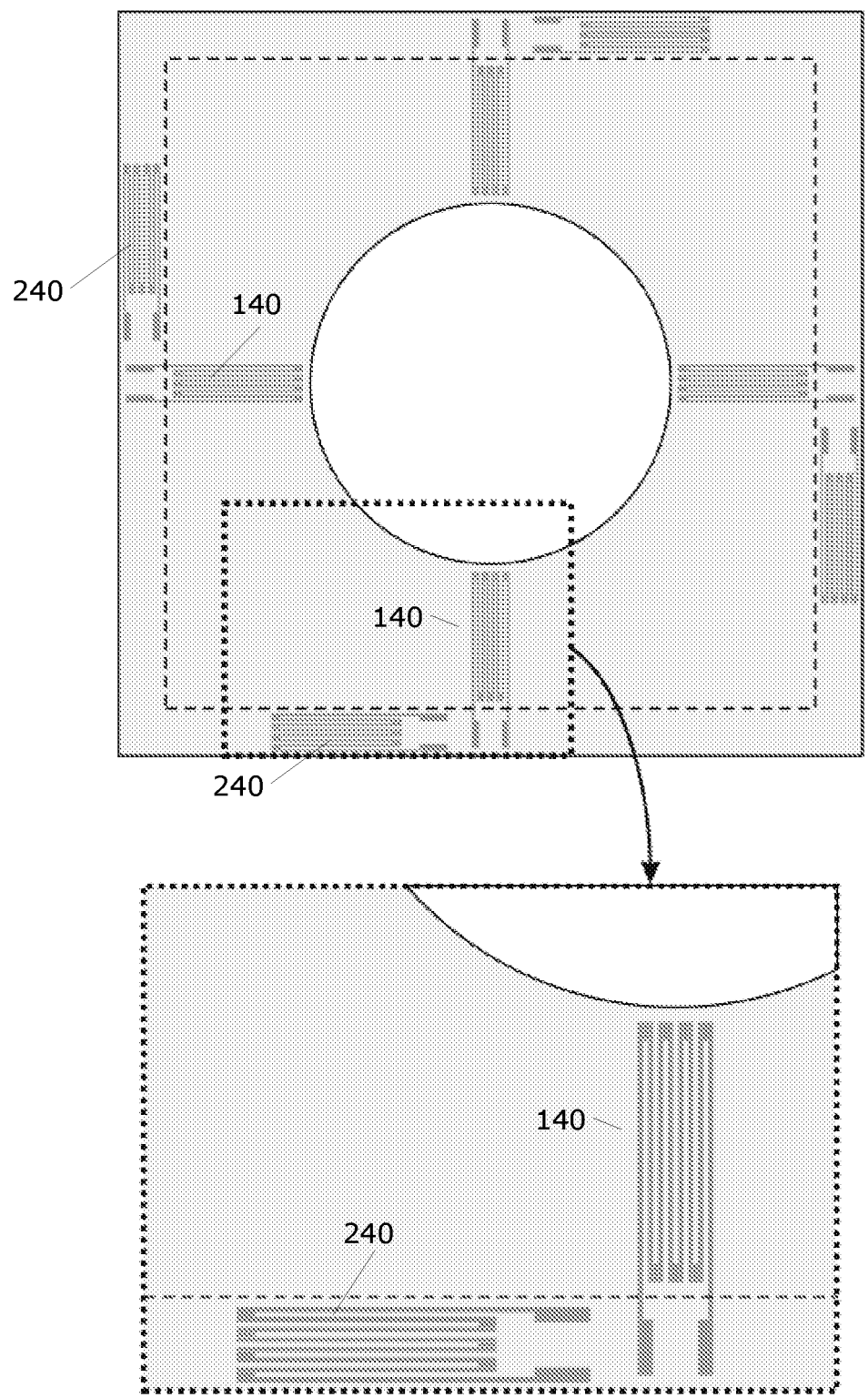
FIG. 2 shows the controllable configured with at least one compensation sensor in additional to deformation measurement sensors.

FIG. 2 shows that the controllable lens is configured with at least one compensation sensor 240 in additional to deformation measurement sensors 140. The compensation sensors 240 are arranged so that they are not, or substantially not, exposed to deformation in response to bending of the first or the second cover member. Since the compensation sensor and the deformation sensors are of the same type, they have substantially the same dependencies to the other physical effects such as temperature.

By connecting a set of sensors comprising one compensation sensor 240 and one measurement sensor 140, when they are resistive strain sensors, in a Wheatstone bridge circuit, the output signal from the Wheatstone bridge will be compensated with respect to the physical effects affecting both the compensation sensor 240 and the measurement sensor 140. Thus, a change in e.g. temperature will not generate a corresponding change in the output signal from the Wheatstone bridge. That is, any change in temperature will affect both sensors 140, 240 in the same way. Because the temperature changes are identical in the two sensors, the ratio of their resistance does not change, and the effects of the temperature change are minimized or substantially eliminated. In this way, a temperature dependency of first and second deformation sensors 140 can be compensated by a corresponding temperature dependency of respective first and second compensation sensors 240.

The compensation sensors may be connected to the support structure so that they are not, or only to a small degree, exposed to deformations when the first or the second cover member are deformed.

As shown in FIG. 2, the four deformation sensors 140 and the associated compensations sensors 240 are arranged rotation symmetric relative to the optical axis 150 of the lens 100. For example, a plurality of deformation sensors may be used to minimize aberrations which may be generated in response to bending.

Advantageously, the control signal or a plurality of control signals for individual actuators 120, such as first and second control signals for first and second actuators 120, may be determined based on sensor signals from a plurality of deformation sensors. For example, a single control signal may be determined dependent on averages or differences of a plurality sensor signals from multiple sensors 140, or a plurality of control signals for a corresponding plurality of actuators 120 may be determined based on a plurality of sensor signals.

Sensor signals from a plurality of deformation sensors 120 may show that the bending deformations of the first cover member deviates for different angular positions around the optical axis 150. In that case, the measured deviations may be used for controlling a plurality of actuators 120 so that each measured bending deformation approaches the same bending reference, or so that the deviations are minimized.

Figure 3A:
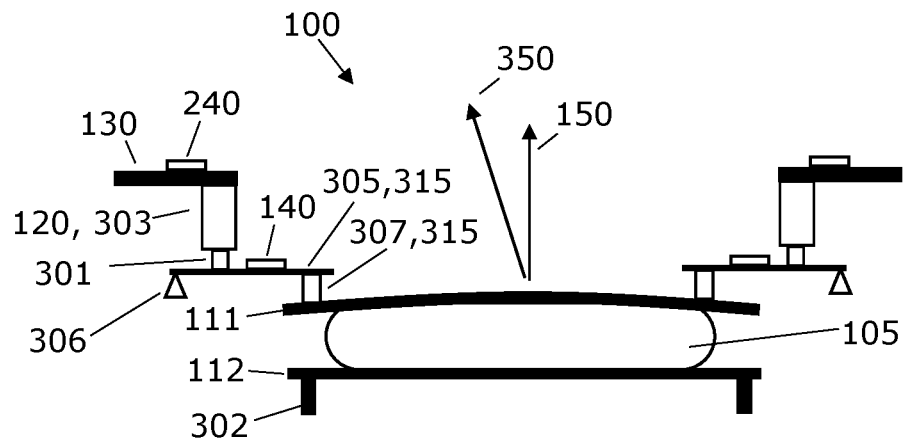
FIGS. 3A-3B shows an embodiment of the controllable lens wherein the actuators are arranged to generate a controllable bending and/or tilt.
Figure 3B:
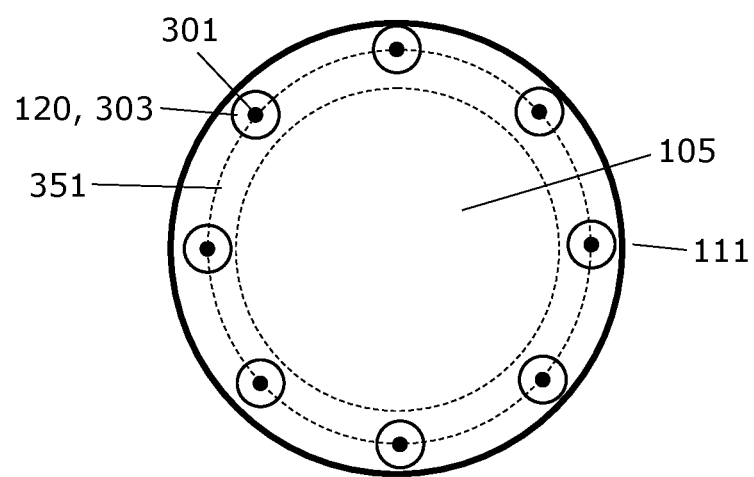

FIGS. 3A-3B shows a principal sketch of an embodiment of the controllable lens 100 wherein the actuators 120 are arranged to generate a controllable bending and/or tilt of the first and/or the second cover member 111, 112 dependent on the measurement signal from the one or more sensors 140 according to similar principles as described for other embodiments.

The actuators 120 are displacement actuators 303 capable of generating a displacement in response to the control signal. Each of the actuators 120 may have a displacement element 301 arranged to displace in a direction parallel or substantially parallel with the optical axis 150.

The one or more actuators 120, 303 are arranged to generate forces on the first or the second cover member 111, 112 along a path 351 encircling the optical axis 150, such as a circle on the surface of the first or the second cover member 111, 112 (FIG. 3B).

The actuators 120 may be linear displacement actuators, such as linear piezoelectric or electromagnetic motors, piezoelectrically actuated cantilever actuators, shape memory alloys, linear screw drives, or linear voice-coil actuators, arranged to apply a displacement at several points, here eight points, along the path 351.

The actuators are fixed to the support structure 130 so that the displacement elements 301 displaces relative to the support structure 130. In this example, the first cover member 111 is not directly connected with the support structure 130, but indirectly via actuators 303 and the elastic element 315. The unactuated cover member, such as the second cover member 112 as illustrated in FIGS. 3A-3B may be supported by a further support structure 302 such as the support structure 130. Alternatively, the second cover member 112 may be actuated by other actuators which are similar to either the displacement actuators 303 or the surface mounted actuators 120 described in connection with FIGS. 1-2.

The path 351 may encircle the transparent, deformable, non-fluid body 105 so that the non-fluid body 105 is surrounded by the path 351 as illustrated. However, the path 351 also be located within the extension of the non-fluid body 105. The actuators 120 could also be located so that they act on the edge of the first or second cover member 111, 112, or located proximate to the edge.

The actuators 120, 303 are arranged along the path 351 and are arranged to generate the displacement in a direction normal or substantially normal to the surface of the cover member 111, 112. Substantially normal, in this context, may imply deviations relative to the normal by up to e.g. 10-15 degrees. Angular variations of the angle between the direction of linear displacement and the surface of the cover member are generated dependent on the bending of the cover member.

The action of the actuators 120, 303 changes the curvature of the first and/or the second cover member dependent on the force, torque or displacement provided by the actuators. Thus, by controlling the actuators, the bending and thereby the optical power of the lens 100 can be controlled. If the actuators are arranged in connection with the first cover member, the second cover member may also bend, or vice versa dependent on the thickness or stiffness of the cover member and dependent on the further support structure 302.

By controlling the actuators 120, 303 to generate different forces on the first and/or second cover member 111, 112 for different actuators along the path 351, the cover member 111, 112 may be forced to tilt and bend. The tilt of the cover member causes a change of direction of the optical axis, shown as the exaggerated optical axis 350, and thereby a change of direction of the transmitted or reflected light. By controlling the tilt of the cover member 111, 112, the change of direction of the transmitted light can be used to compensate camera rotations (e.g. due to hand shaking), i.e. to obtain optical image stabilization (OIS).

It is noted that the actuators 120, 303 could be arranged to act on either the first or the second cover member 111, 112. It is also possible that the actuators 120, 303 are arranged to act on both the first and the second cover member 111, 112 so that both cover members are forced to bend by the action of the actuators 120, 303, possibly so that actuators on either side are independently controllable, i.e. so that the displacement/force applied on one of the cover members is controllable independent of the displacement/force applied on the other.

The tilt of one of the cover members 111, 112 of a lens may be applied independently of the bending of another cover member 111, 112 of the lens 100. For example, actuators 120 of any type may be provided for bending the first cover member 111, while displacement actuators 303 are provided for bending of the cover member.

In the principal sketch in FIG. 3A, the actuator displacement is amplified via a hinged beam 305 arranged via a hinge connection 306. Sensors 140 may be arranged on the beam and thereby measures the beam deformation. The beam deformation correlates with the bending and the tilt and, therefore, the sensor signal from the sensors mounted on the beams 305 can be used for controlling the actuators 120, 303 to achieve a desired bending and/or tilt of the first or the second cover member 111, 112.

As an alternative to displacement actuators 303, surface mounted actuators 120 such as piezo elements could be attached to the beams 305 and thereby provide a linear displacement, e.g. via elastic connections 307.

For practical purposes, other designs than the principal solution in FIG. 3A would likely be used, but based on similar principles and use of displacement actuators 303. According to the principle, one or more elastic elements 315 such as the hinged beam 305 are arranged so that they connect the displacement actuators 303 with the first and/or the second cover member 111,112. The elastic elements 315 may have various configurations, but in general are arranged to deform elastically in response to the force applied by the displacement actuator 303. Deformation sensors 140 attached to one or more of the elastic elements 315 measures the deformation of the elastic elements 315, or the deformation of at least a part of the elastic elements 315. Due to the relationship between the deformation of the elastic elements and the bending and tilt of the first or the second cover member 111, 112, the measured deformations can be used for determining the control signal for controlling the actuators 140.

The elastic elements 315 deforms elastically in response to relative displacement between the first or second cover member 111,112 and the displacement actuator 303.

FIG. 3A shows that the elastic connection between the displacement actuator 303 and the first cover member 111 in addition to the hinged beam 305 comprises a further elastic element 307.

The further elastic element 307 may arranged to deform in at least a radial direction in response to bending or tilt of the first or second cover member 111, 112, so that a change of the radial extension of the first or second cover member 111, 112 due to the bending or tilt is accumulated by the radial deformation. By the radial displacement is understood that at least a component of the relative radial displacement has a direction perpendicular to the optical axis in the radial direction.

For example, the further elastic element 307 may be made from an elastic adhesive e.g. achieved by performing a gluing process. Preferably, the further elastic element 307 has a low stiffness in response to deformations in the radial direction and a high stiffness in the direction of displacement of the displacement actuator 303, in order to transfer the actuator displacement to the cover member 111, 112.

Figure 4A:
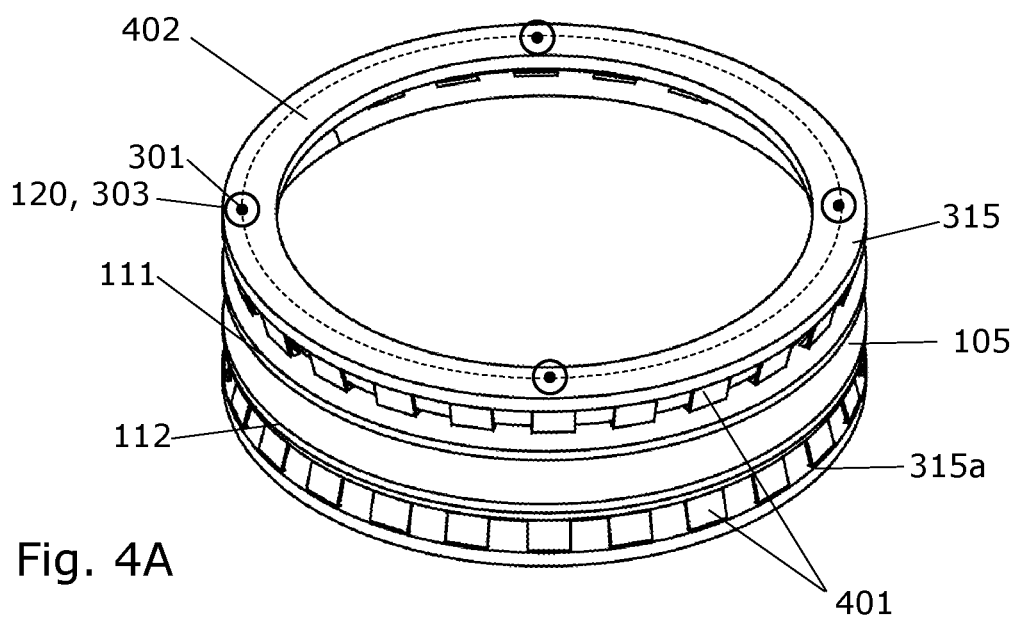
FIGS. 4A-4C shows an example of an elastic element connecting displacement actuators with a cover member.
Figure 4B:
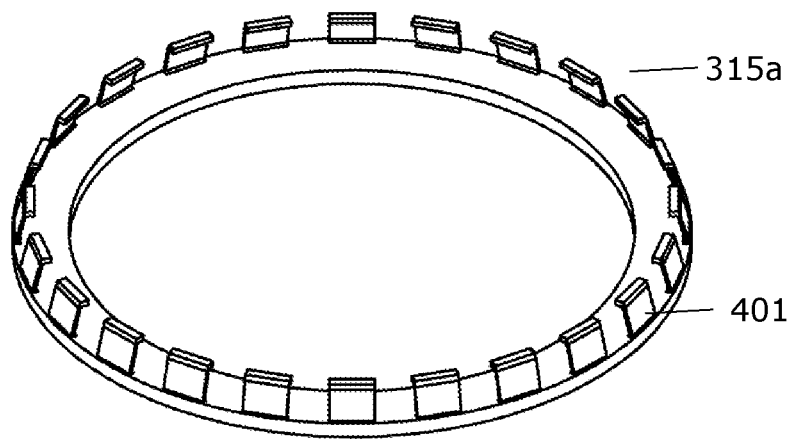
Figure 4C:
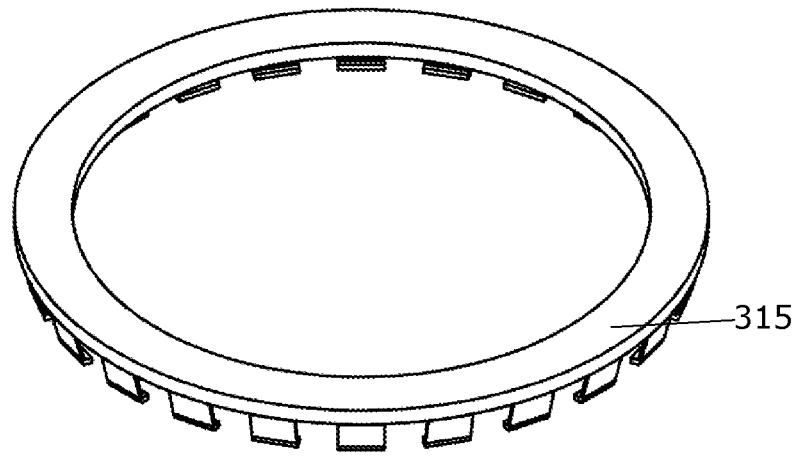

FIGS. 4A-4C show an example of an elastic element 315 connecting the displacement actuators 303 with the first cover member 111. In this example, actuators are also arranged to provide bending of the second cover member 112, via a further elastic element 315a. In these figures, the actuators 303 are not shown, only the contact points of the displacement elements 301 and an indication of the actuators 120, 303.

The elastic element 315 is configured with a plurality of deformable portions in the form of a plurality of spring elements 401 such as cantilevered metal beams. In response to the bending of the first cover member 111, the spring elements 401 bend. The bending of the spring elements 401 facilitates requirements of the elastic element 315 to provide a low stiffness in response to deformations in the radial direction towards the optical axis 150, and high stiffness in the direction of the displacement of the displacement actuators 303 to efficiently transfer the actuator displacement to the first cover member. The low radial stiffness ensures that bending of the first cover member is not restrained by the elastic element 315. Each of the spring elements 401 are separated from neighbor spring elements to enable each of the spring elements 401 to deform independent or substantially independent from neighbor spring elements 401.

The elastic element 315 comprises a support member 402. As principally illustrated, the displacement actuators 303 are arranged to act on the surface of the support member 402.

In this example, the support member 402 is formed as a ring-shaped structure with a hole constituting an aperture for the lens 100.

In this example, the first and second cover members 111, 112 are each actuated independently via the upper elastic element 315 and the lower second elastic element 130a.

One or more sensors 140 may be attached to the spring elements 401 to measure the deformation. The deformation is due, at least partly, to the bending of the first cover member 111 whereby the measurement signal from the sensors 140 is directly related to the bending.

FIG. 5A shows an optical assembly 599 comprising a controllable beam deflection device 500. In this embodiment, the second cover member 112 is a prism 501 and the first cover member 111 is a reflective cover member such as a mirror arranged opposite to the hypotenuse of the prism 501. The incident light 502, i.e. the light from object space to be imaged onto the image sensor, is transmitted through the prism 501 via one of its short sides and through the non-fluid body to the first cover member in order to reflect the incident light 502 and redirect the incident light to a different direction, such as a direction which is perpendicular or substantially perpendicular to the direction of incidence. Thus, the reflective first cover member 111 causes a folding of the optical axis. A portion of the incident light 502 may be transmitted through the first cover member, e.g. due to a partial reflector comprised by the first cover member 111.

Displacement actuators 303 as described in connection with FIG. 3A may be arranged to generate a controllable tilt of the reflective cover member 111. As described in connection with FIG. 3A, sensors 140 arranged on the flexible elements 315 provides a measurement signal which is indicative of the displacement amplitude of the actuator and thereby the tilt angle of the reflective cover member 111. The two actuators shown in FIG. 5A may operate with opposite displacement directions to facilitate tilt of the reflective cover member 111. Alternatively, the reflective cover member 111 may be hinged at one side.

As an alternative, sensors 140 may be arranged to provide a direct measurement of the displacement of the actuators 303. Such sensors may be based on optical or resistive distance measurements and integrated with the sensors. The displacement actuators 300 may be configured without the hinged beam 305. For example, the displacement actuator 303 may be connected directly to the reflective cover member 111, possibly via the further elastic element 307, when a hinged beam 305 is not used to provide displacement amplification.

The controllable lens 100 and the controllable beam deflection device 500 are examples of a controllable optical assembly according to various embodiments.

Similarly to FIG. 3A, the first cover member 111 is not directly connected with the support structure 130, but indirectly via actuators 303 and the elastic element 315.

FIG. 5A illustrates an optical sensor 550 as an alternative to the sensor 140. The optical sensor 540 comprises a light source 551 configured to output a light beam such as a collimated beam 553 and an optical detector 552. The optical detector 552, such as a position sensitive detector or a quadrant detector, generates an output which is dependent on the beam's 553 1D or 2D position on the detector 552. Accordingly, the optical sensor 550 is able to measure at least the tilt of the first cover member 111.

FIG. 5B illustrates the optical sensor 550 used in an example where the first cover member 111 is arranged to be bent by displacement actuators 330 directly connected to the first cover member 111, although surface mounted actuators 120 may be used as well. The divergence of the beam is affected by the bending of the first cover member 111 and, thereby, the size of the beam spot on the detector is directly related to the bending of the first cover member. The detector 552 is therefore capable of generating an output that depends on the size of the beam spot. Clearly, the detector 552 may be a type which output is dependent on both the position and size of the beam spot on the detector.

Accordingly in this embodiment, the alternative optical sensor 550 is configured to transmit a light beam 553 through the non-fluid body 105, through at least one of the first and second cover members 111, 112 and so that the direction and/or divergence of the light beam is affected by the at least one cover member 111, 112 arranged to tilted and/or bent by the actuators 120, 303.

The control system 190 may be part of the deflection device 500 or the optical sensor 550 and arranged to control the actuators 120 based on the measured tilt such as in a feed-back control system where the difference between the measured tilt and the desired tilt angle are minimized.

The first cover member 111 may alternatively be configured as a transparent cover member 511 in order to transmit the incident light 502 through the cover member via refraction. The transparent cover member may advantageously be located opposite to one of the two perpendicular faces of the prism, with the non-fluid body 105 sandwiched between the cover member 511 and the prism. The transparent cover member 511, can be used to control the propagation direction of the light beam 502 by controlling the tilt of the cover member 511. Accordingly, the prism may be configured with the reflective cover member 111 and the refractive, i.e. transparent, cover member 511, as shown in the simplified illustration in FIG. 5C. Actuators 120 for tilting the cover members 111, 511 are not included for convenience.

Figure 6A:
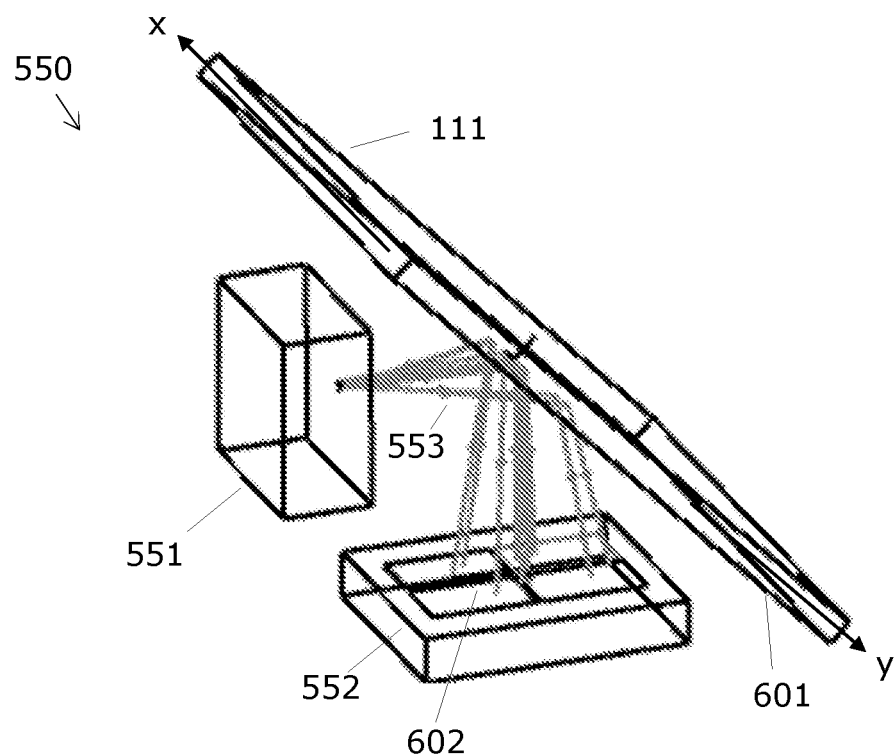
FIGS. 6A-B shows details of an optical sensors.

FIG. 6A shows the optical sensor 550 of FIG. 5A in more detail. The optical sensor 550 comprises the light source 551 arranged to transmit a light beam 553, such as a divergent light beam, towards the back side 601 of the first cover member 111, i.e. the reflector, or the transparent cover member 511. The beam 553 is reflected by the back side 601 and, therefore, the propagation direction of the reflected beam 553 is affected by the tilt of the cover member 111, 511.

By the back side 601 is meant the side which faces away from the prism 501. The back side 601 may be coated to provide reflection properties. Thus, the back side of the cover member 111, 511 may be used as an alternative to, or in addition to, front side of the cover member 111, 511 as shown in FIG. 5A, where the front side faces the prism 501. Use of the back side 601 may be advantageous for obtaining independent sensor signals from the detector 552, or different detectors for different cover members 111, 511, in a configuration where the deflection device 500 is provided with both the reflective and transparent cover members 111, 511.

The light detector 552 is arranged to measure a change of the light beam 553 caused by the tilt of the cover member 111, 511. The change of the light beam 553 may involve a change of the position where the light beam 553 hits the light detector 552 and/or a change of the size of the spot of the light beam 953 on the light detector 552.

The light detector 552 may be configured with at least four individual light detectors 602, where each of the individual light detectors 602 are capable of generating an output signal which is correlated with the power of the light impinging the individual light detector. By processing signal outputs from the individual light detectors 602, such as by comparing the individual outputs, changes in the tilt of the cover member 111, 511 can be determined. The measured tilt can be used in the control of the actuator systems 120, 303 such as in a feed-back control system of the control system 190 where the difference between the measured tilt and the desired tilt angle are minimized.

Figure 6B:
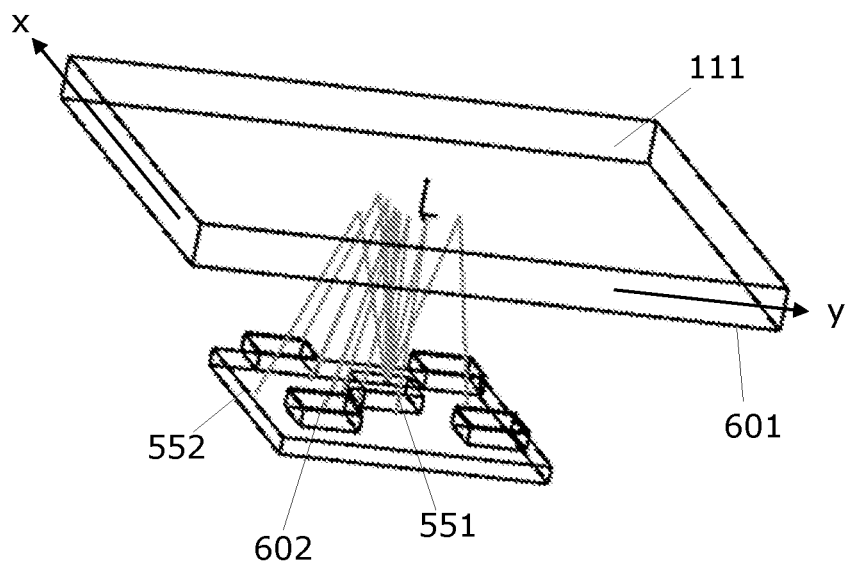

FIG. 6B shows an alternative embodiment of the optical sensor 550 where the light source 551 is arranged at a center of the individual light detectors 602, i.e. so that all light detectors 602 surrounds the light source 551. In this configuration the plane of the light source 551 and light detectors 602 may be parallel or substantially parallel with the back side 601 of the reflective or transparent cover member 111, 511.

Figure 7:
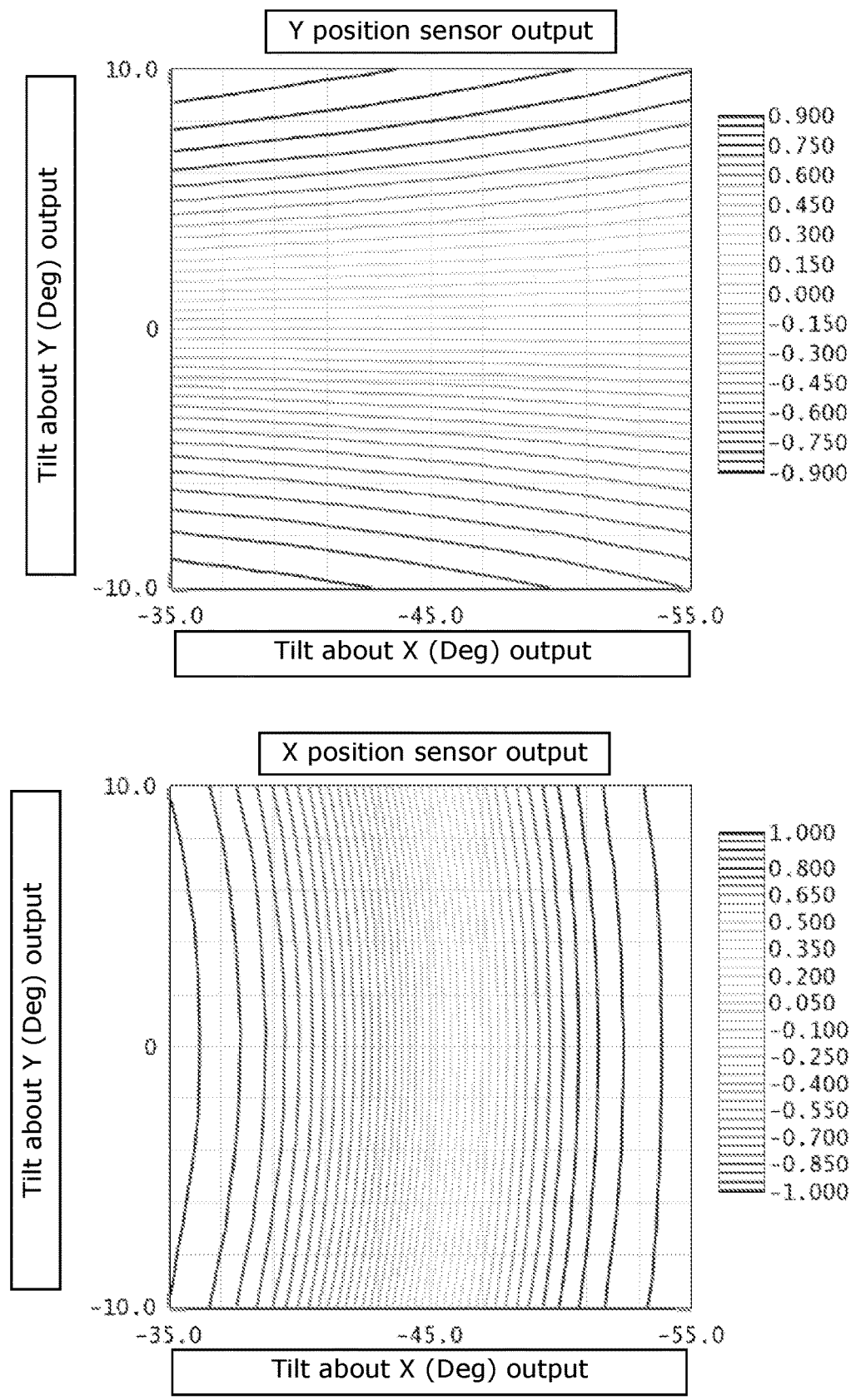
FIGS. 7-8 shows linearity performance of the optical sensors.

FIG. 7 shows linearity performance of the optical sensor 550 of FIG. 6A. As shown in the upper figure, the y-position output from the detector 552 depends slightly on y-axis tilt angles of the cover member 111, for variations of the x-axis tilt. Similarly, the lower figure shows that the x-position output from the detector 552 depends slightly on x-axis tilt angles, for variations of the y-axis tilt. Thus, the output signal from the detector 552 is slightly non-linear when the tilt angle is a combination of two rotation axes (in cases where the controllable beam deflection device 500 is configured to provide tilt around two perpendicular x and y axes).

Figure 8:
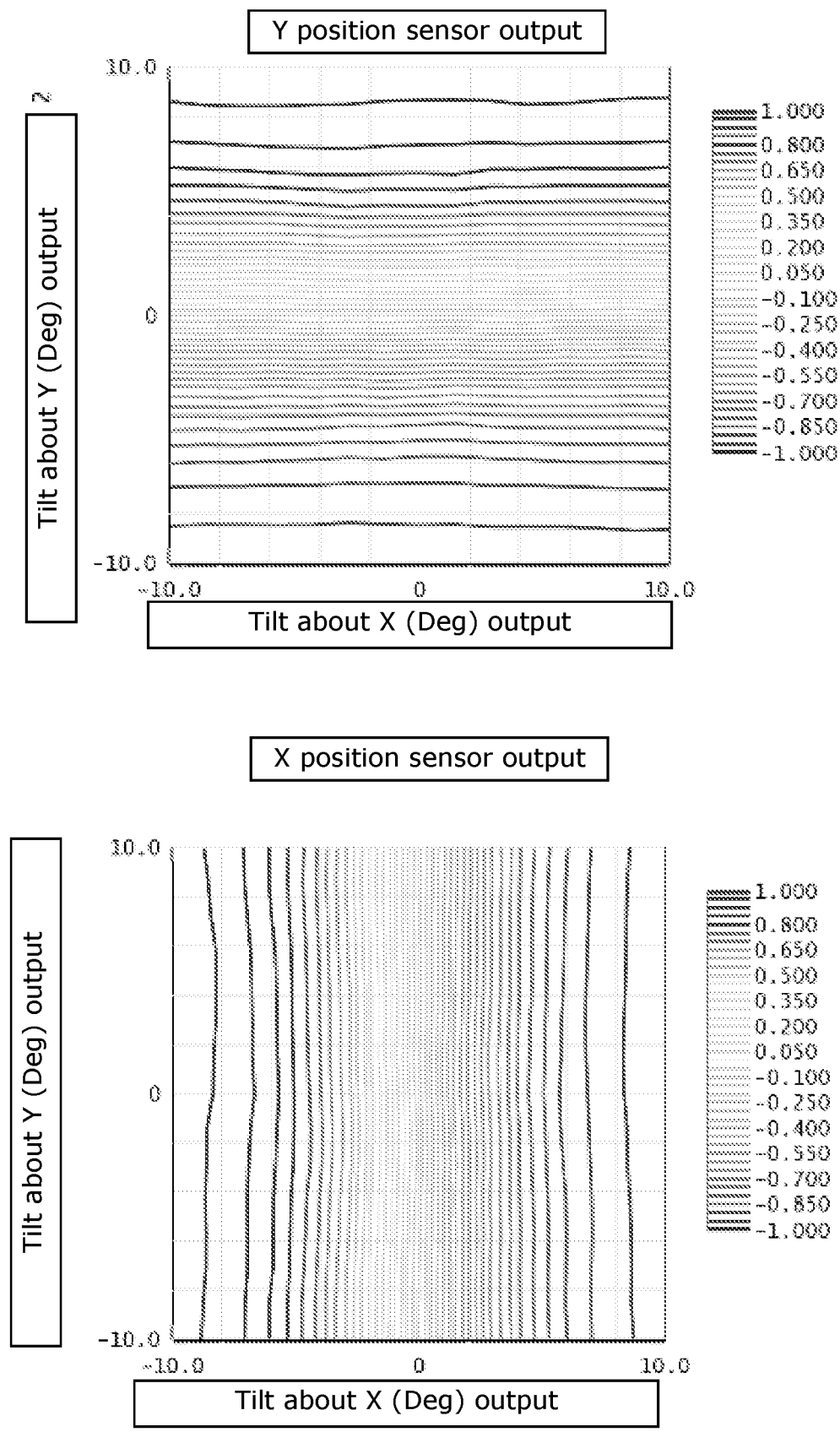

FIG. 8 shows the linearity performance of the optical sensor 550 of the FIG. 6B configuration. Thus, this configuration of the optical sensor shows improved linearity of the output signal from the detector 552 and therefore may eliminate the need for calibration of the detector signal output.

Figure 9:
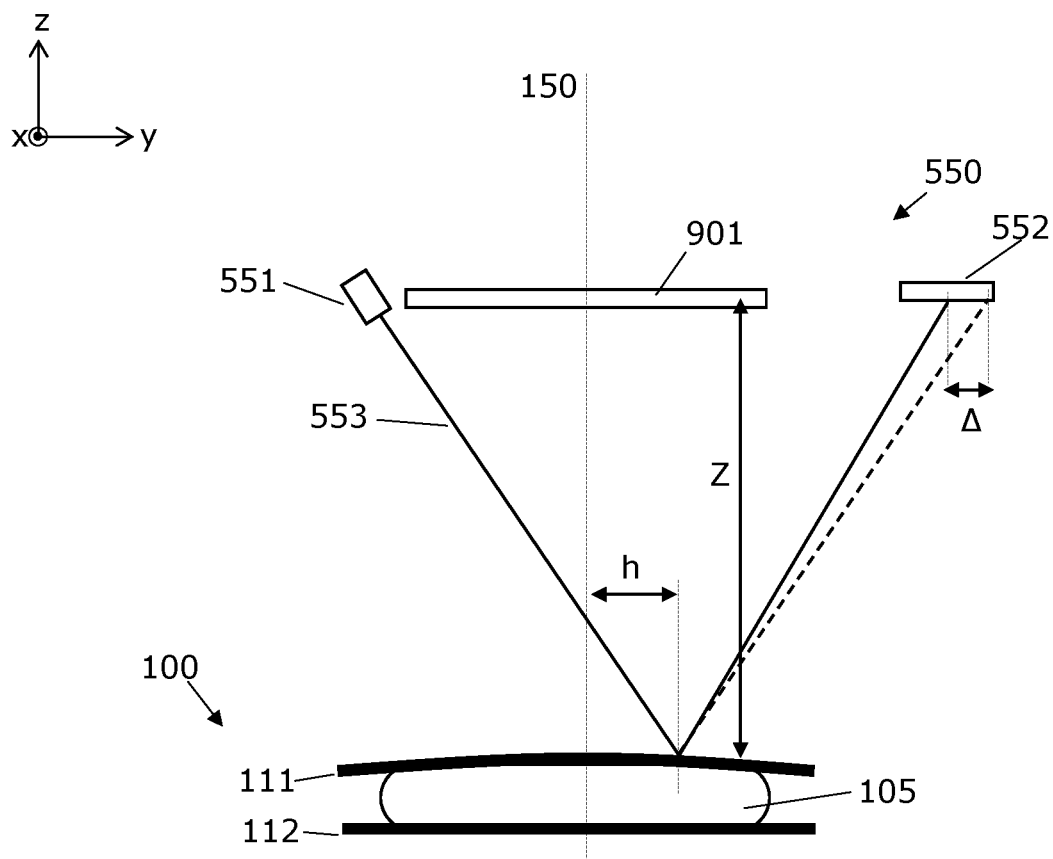
FIG. 9 shows an alternative optical sensor configured to determine the optical power of the controllable lens.

FIG. 9 shows an alternative configuration of the optical sensor 550 configured to determine the optical power of the controllable lens 100.

The light source 551 is arranged so that the light beam 553, such as the center of the intensity profile of the light beam 553, hits the first and/or the second cover member 111,112 a distance h away from the optical axis 150. In this case the light beam 553 is preferable a collimated light beam. The surface of the first and/or the second cover member 111,112 which reflects the light beam 553 faces the image sensor 901 of the camera. The distance between the controllable lens 100, such as said reflecting surface, and the image sensor 901 is Z. The light detector 552 is arranged to detect, at least a portion of, the reflection of the light beam 553. The light source 551 and the detector 552 are located on opposite sides of the image sensor 901, but not necessarily collinear with the center of the image sensor 901.

When the detector 552 is located at the same, or substantially the same distance Z from the lens 100, although this is not a requirement, the displacements Δ between the location where the reflected beam 553 hits the detector 552 and the location where the beam 553 reflected from a plane cover member 111, 112 hits the detector 552 is:

$$\Delta = \frac{hZ}{2R}$$

where h is the distance along the y axis from the optical axis 150 to the point where the light beam 553 hits the first or second cover member 111,112, Z is the distance along the z axis between the image sensor 901 and first or second cover member 111,112, R is the curvature (measured as the radius) of the surface of the first or second cover member 111,112 facing the image sensor 901. The optical power P of the lens, assuming a plane-convex lens is given by:

$$P = -\left(\frac{nlens - nair}{nair}\right)\frac{1}{R}$$

with nlens and nair being the refractive index of the lens and the surrounding air. Accordingly, the optical power as varied by the actuators can be determined from the measured displacement values Δ.

The light source 551 and the detector 552 may be located so that the plane of incidence of the light beam 553 comprises the optical axis 150, i.e. so that the light source 551 and the detector 552 are aligned with the image sensor 901. In another embodiment, light source 551 and the detector 552 are located so that plane of incidence spanned of the light beam 553 does not comprise the optical axis 150, i.e. so that the light source 551 and the detector 552 are not aligned with the image sensor 901.

Figure 10A:
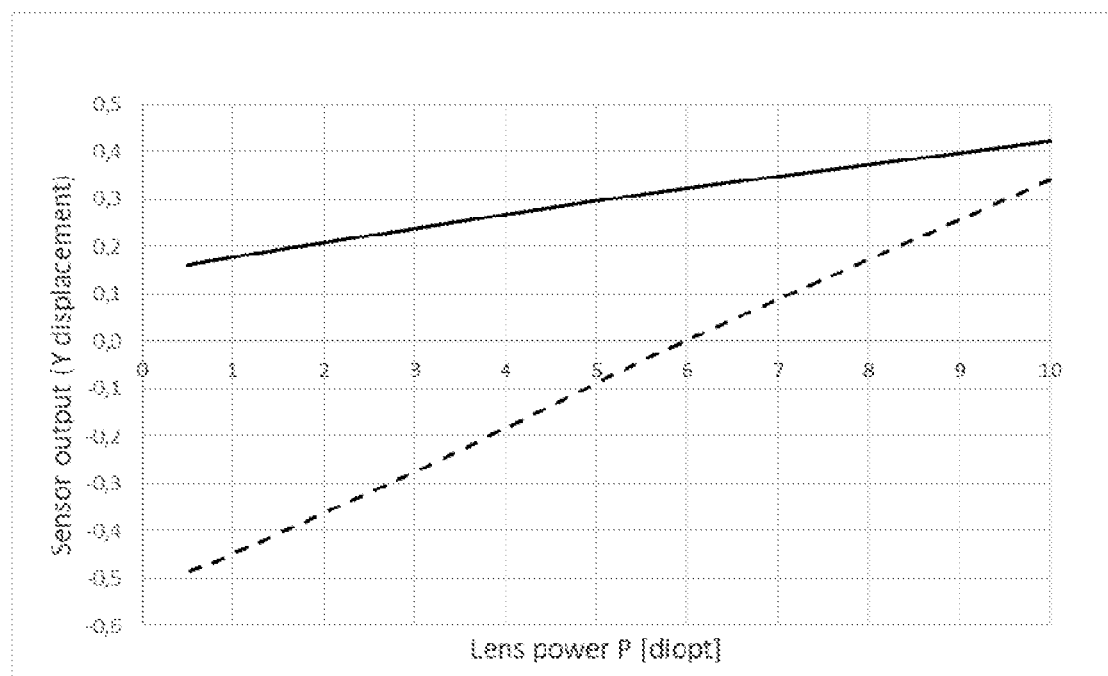
FIGS. 10A-10B shows the output signal from the optical sensor of FIG. 9.

FIG. 10A shows the output signal from the detector 552 as a function of the optical power determined from the displacement values Δ for a distance of 5 mm between the detector 552 and the optical axis 150 measured along the y axis (solid curve) and for a corresponding distance of 7 mm (dashed line). In this example, the light source 551 and the detector 552 are aligned with the image sensor 901. As shown, better sensitivity is achieved when the detector 552 is located farther away from the image sensor 901, but at the cost of a bigger form factor (in the y direction).

Figure 10B:
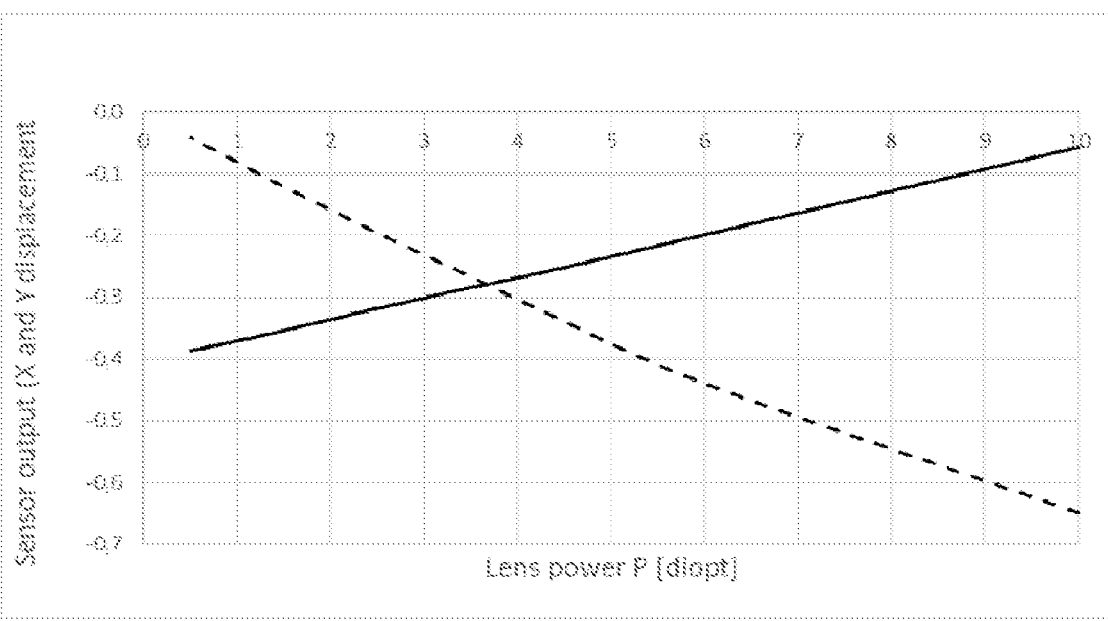

FIG. 10B shows the output signal from the detector 552 in a similar configuration as in FIG. 10A with a distance of 7 mm between the detector 552 and the optical axis 150. However, in this example, the light source 551 and the detector 552 are not aligned with the image sensor 901, i.e. the plane of incidence does not comprise the optical axis 150. Due to the non-aligned configuration, the reflected light beam 553 displaces both in x and y directions on the detector 552. The solid line shows x displacements as in FIG. 10A, and the dashed line shows y displacements. The sensitivity to reflections causing displacements in x and y directions may be used to determine astigmatism, i.e. different radii in of the facing surface of the first or second cover member 111,112 in orthogonal directions by comparing the x and y displacements and using the equation $$\Delta = \frac{hZ}{2R}$$

with the relevant values of h for the two orthogonal directions.

Figure 11A:
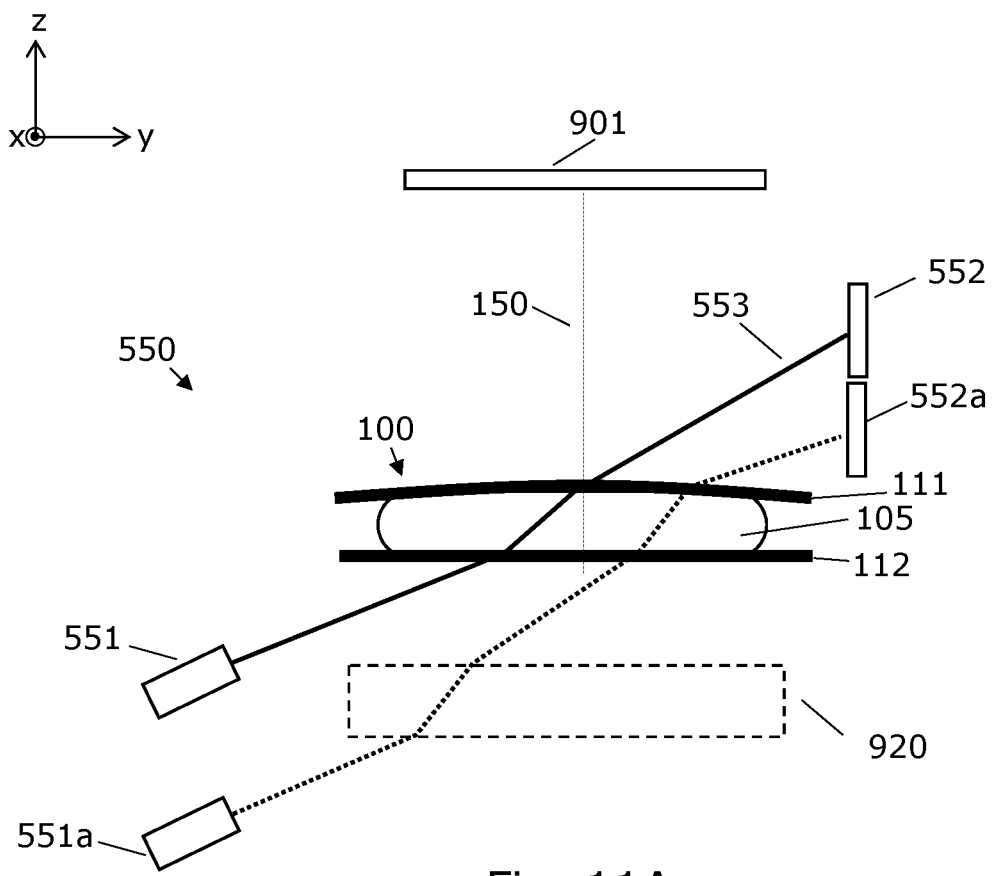
FIGS. 11A-B shows another configuration of the optical sensor configured to determine the optical power of the controllable lens and curves showing the relationship between the ratio of x and y axis diameters of the light beam spot on the detector of the optical sensor.

FIG. 11A shows another configuration of the optical sensor 550 configured to determine the optical power of the controllable lens 100.

The lens 100 is located between the light source 551 and the detector 553, i.e. so that the light source 551 is arranged to transmit the light beam 553 towards the outward facing surface of one of the first and second cover member 111, 112 and so that the detector 553 is arranged to receive the light beam 553 transmitted through the outward facing surface of the other of the first and second cover member 111, 112. Accordingly, the light beam 553 is transmitted through the first and the second cover members 111, 112, at a high incident angle. The light detector 552 may be arranged so that its input aperture faces the optical axis 150, i.e. so that the normal to the detector surface is perpendicular or substantially perpendicular to the optical axis 150.

The incident angle between the light beam 553 and the surface of the first and second cover member 111, 112 may be below 60 degrees, such as below 40 degrees or below 30 degrees.

The light source 551 and the detector 552 may be arranged so that the plane of incidence of the light beam 553 comprises the optical axis 150, or so that plane of incidence does not comprise the optical axis 150.

In case of astigmatism created by the lens 100, e.g. due to errors in the bending of the cover member 111, 112 such as due to actuator inaccuracies, the spot of the light beam 553 will be non-circular (assuming a rotation symmetric intensity profile of the incident light beam 553) and the output from the individual light detectors 602 of the detector 552 will generate signals corresponding to the astigmatism.

Further, since astigmatism is proportional to the lens power P, the lens power P can be determined by measuring the deformation of the spot, i.e. the elliptic shape of the spot, by use of the four detectors 602 of the detector 552.

Figure 11B:
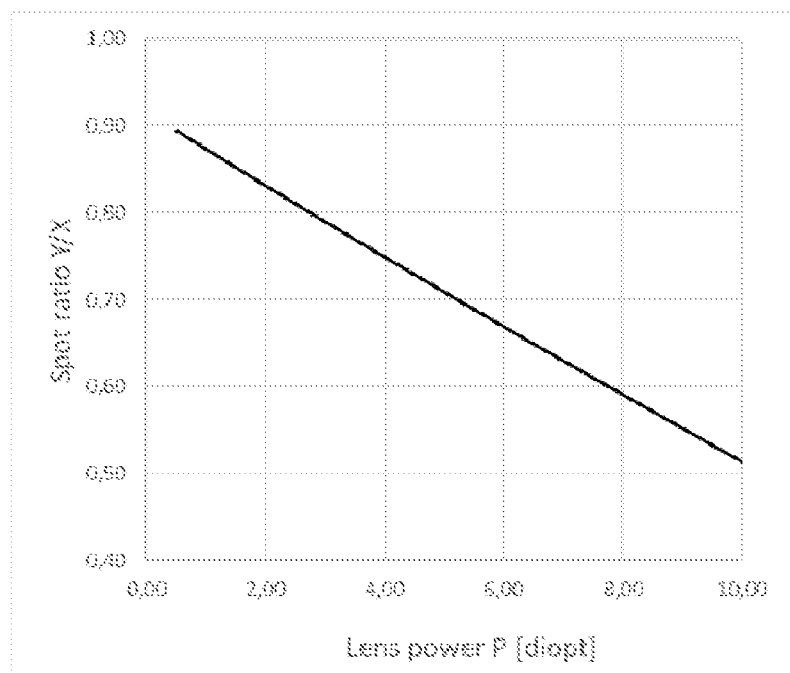

FIG. 11B shows the relationship between the ratio of x and y diameters of the light beam spot on the detector 553 and the lens power P.

FIG. 11A shows that the light source 551a and the detector 552a may be arranged so that the light beam (dashed line) is transmitted through other optical components 920 such as fixed lenses before being transmitted through the controllable lens 100, and/or so that the light beam is transmitted through other optical components 920 after transmission through the controllable lens 100. Accordingly, the controllable lens and other optical components may be placed between the light source 551 and the detector 552 along the optical axis. This may be advantageous in a compact optical system not providing space for placement of the light source 551 and/or the detector 552 on the opposite sides of the controllable lens 100.

Figure 12:
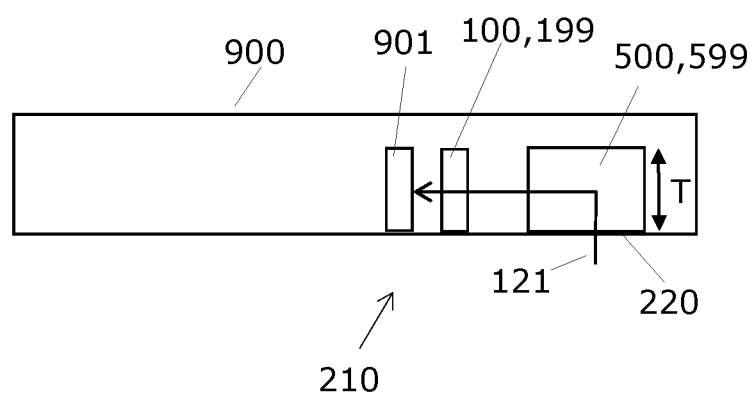
FIG. 12 shows an electronic device such as a camera module comprising the optical assembly.

FIG. 12 shows a camera module 900 comprising the controllable controllable lens 100 and an image sensor 901 arranged to receive the light transmitted through the lens 100. Optionally, the camera module 900 may include a beam deflection device 500 arranged to receive and redirect the incident light 502 to be imaged and may include additional optical components such as fixed optical lenses which may be arranged in a lens stack which may also comprise the controllable lens 100. Accordingly, the camera module 900 includes an optical assembly 199, 599 embodied by the controllable lens 100 and/or the beam deflection device 500. The optical assemblies 199, 599 may be combined into a single optical assembly comprising both the variable lens 100 and the deflector 500. The camera module 600 may be used in an electronic device such as a smart phone. Other electronic devices, e.g. a beam scanner, may use the optical assembly without the image sensor for other purposes than imaging.

The invention claimed is:

1. A controllable optical assembly with a variable optical power and/or a variable beam deflection comprising:
- a first cover member and a second cover member, wherein one of the first or second cover members is a transparent cover member, and the other of the first or second cover members is a transparent or reflective cover member,
- a transparent, deformable, non-fluid body positioned between the first and second cover members, so that the first and second cover members and non-fluid body constitute a lens or a light deflector with an optical axis intersecting the non-fluid body and the first and/or the second transparent cover members,
- one or more actuators configured to generate a controllable bending and/or tilt of at least the first cover member dependent on a control signal, wherein the control signal is obtainable from first and second measurement signals,
- first and second sensors configured to provide the first and second measurement signals so that the measurement signals are indicative of the bending and/or tilt of at least the first cover member, and wherein the first sensor is an optical sensor and the second sensor is a deformation sensor
- wherein the optical sensor comprises a light source configured to transmit a light beam so that the light beam is affected by the bending or tilt of the first and/or the second cover member, and wherein the sensor comprises a light detector configured to measure a change of the light beam relating to the bending and/or tilt, and
- wherein the deformation sensor comprises a piezo electric sensor element connected to the first cover member, and/or
- wherein the deformation sensor is connected to a surface of the one or more actuators.

2. The controllable optical assembly according to claim 1, wherein the second cover member is a prism and the first cover member is the reflective cover member arranged opposite to the hypotenuse of the prism to reflect at least a fraction the intensity of the incident light.

3. The controllable optical assembly according to claim 1, further comprising one or more elastic elements connecting the displacement actuators with the first cover member and/or the second cover member, wherein at least a portion of each of the one or more elastic elements is configured to deform elastically in response to the actuator displacement.

4. The controllable optical assembly according to claim 1, wherein the one or more sensors are configured to measure the deformation of a portion of the respective one or more elastic elements.

5. The controllable optical assembly according to claim 1, wherein the support structure at least partially surrounds the non-fluid body and wherein the support structure is separated from the non-fluid body to allow the non-fluid body to expand without contacting the support structure at least along a part of the support structure which surrounds or partially surrounds the non-fluid body.

6. The controllable optical assembly according to claim 1, wherein the one or more actuators comprises one or more piezo electric elements connected to the surface of the first cover member.

7. The controllable optical assembly according to claim 1, wherein the one or more piezo electric elements comprises a ring shaped piezo electric element connected to the surface of the first cover member, wherein the ring shaped piezo electric element comprises an aperture, which allows transmission of the light.

8. The controllable optical assembly according to claim 1, wherein the piezo electric sensor element is comprised by the one or more piezo electric elements configured as the one or more actuators.

9. The controllable optical assembly according to claim 1 wherein the one or more actuators are positioned between the one or more deformation sensors and the first or the second cover member.

10. The controllable optical assembly according to claim 1, wherein the optical assembly further comprises at least one compensation sensor configured so that it is not, or substantially not, exposed to deformation in response to bending of the first or the second cover member and, wherein the at least one compensation sensor is of the same type as the deformation sensor connected to the surface of the one or more actuators.

11. The controllable optical assembly according to claim 10, wherein the at least one compensation sensor is connected to a support structure, configured to support the first cover member and/or the second cover member.

12. The controllable optical assembly according to claim 1, wherein the light source is configured so that the light beam is reflected by the first or the second cover member, which is configured to be bent or tilted.

13. The controllable optical assembly according to claim 1, wherein the light detector comprises at least two individual light detectors, wherein each of the individual light detectors are capable of generating an output signal, which is correlated with the power of the light impinging the individual light detector.

14. The controllable optical assembly according to claim 1, wherein an output aperture of the light source and input apertures of the individual light detectors are configured so that they face the first or the second cover member.

15. The controllable optical assembly according to claim 1, wherein the light source is arranged at a center of a circle, which circumscribes the individual light detectors.

16. The controllable optical assembly according to claim 1, wherein the light source is configured so that the light beam, hits the first and/or the second cover member a distance (h) away from the optical axis.

17. The controllable optical assembly according to claim 1, wherein the light source is configured so that the light beam is transmitted through the first or the second cover members and wherein the light detector is configured to measure the transmitted light beam.

18. An electronic device comprising the optical assembly according to claim 1 and a control system configured to generate the control signal dependent on the first and second measurement signals to achieve a desired bending or tilt of the first and/or the second cover member.

19. A method for controlling an optical assembly according to claim 1, comprising:
    obtaining first and second measurement signals from the one or more sensors so that the measurement signals are indicative of the bending and/or tilt of the first and/or the second cover member,
    determining a control signal based on the measurement signals, and
    controlling bending and/or tilt of the first and/or the second cover member dependent on the control signal.

* * * * *